June 19, 1956   M. L. JACOBS ET AL   2,751,575
EMERGENCY SIGNAL SYSTEM FOR MOTOR VEHICLES
Filed March 8, 1954   2 Sheets-Sheet 1
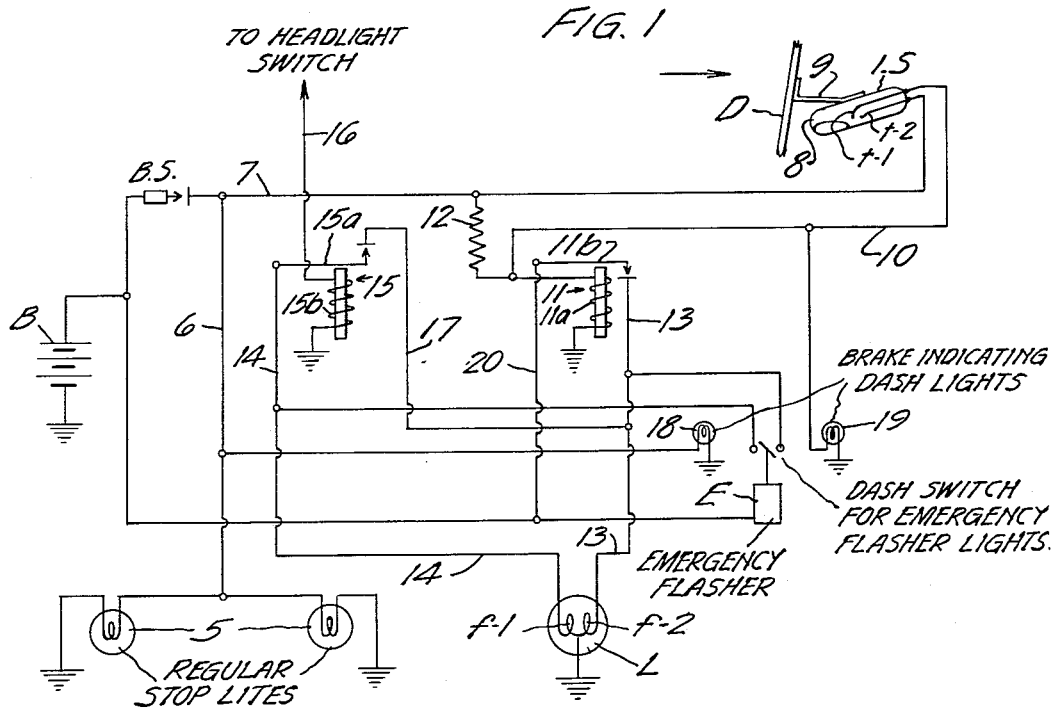
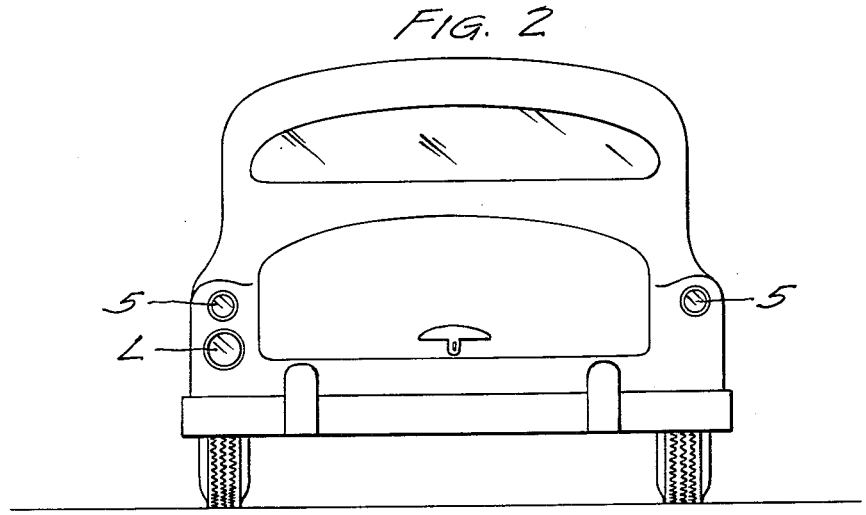
INVENTORS
MARCELLUS L. JACOBS
JOSEPH H. JACOBS
BY
Williamson, Williamson, Schroeder & Adams
ATTORNEYS June 19, 1956  M. L. JACOBS ET AL  2,751,575
EMERGENCY SIGNAL SYSTEM FOR MOTOR VEHICLES
Filed March 8, 1954
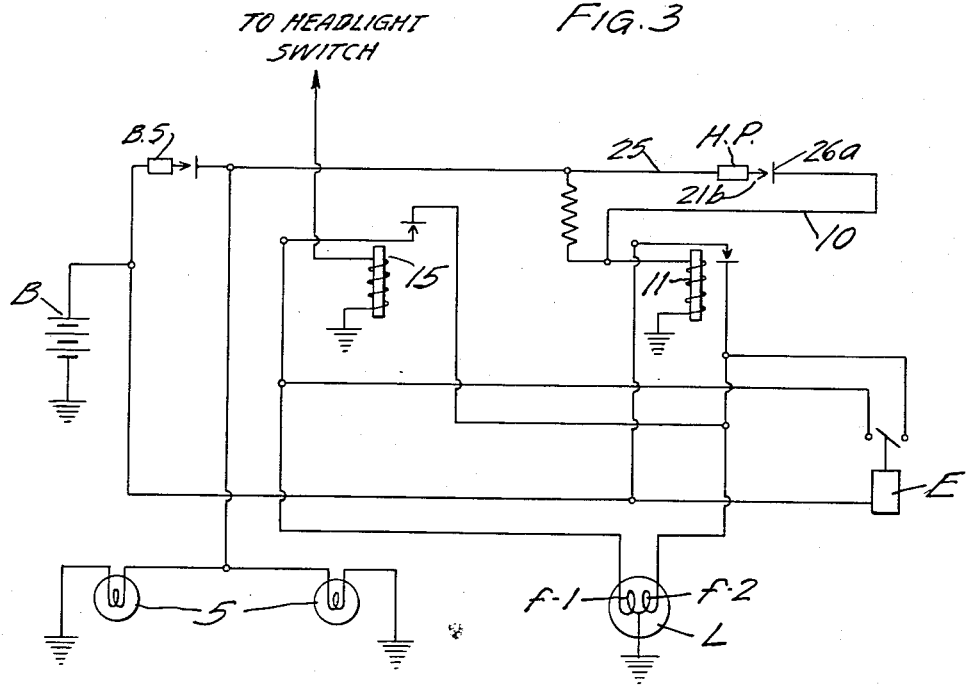
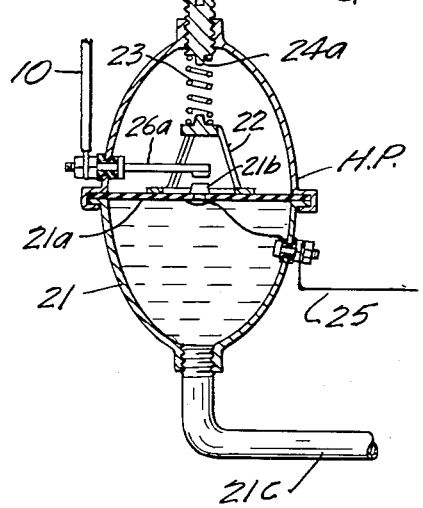
INVENTORS
MARCELLUS L. JACOBS
JOSEPH H. JACOBS.
BY
Williamson, Williamson, Schroeder & Adams
ATTORNEYS United States Patent Office 2,751,575
Patented June 19, 1956

2,751,575
EMERGENCY SIGNAL SYSTEM FOR MOTOR VEHICLES

Marcellus L. Jacobs and Joseph H. Jacobs, Minneapolis, Minn.

Application March 8, 1954, Serial No. 414,539

5 Claims. (Cl. 340—72)

This invention relates to emergency, illuminated signal systems for motor vehicles adapted to very effectively warn the drivers of following, as well as cross-traffic drivers, that a vehicle is coming or has come to a rapid or emergency stop.

At the present, conventional motor vehicles employ stop warning lights at both sides of the rear of a car which become illuminated at a constant intensity whenever the driver begins to apply brake control. Such a system, of course, alerts the drivers of following cars but no means or system is provided to in any way indicate the degree of braking or the rapid deceleration of the leading vehicle. Many accidents occur because the driver of the following vehicle has no knowledge that the vehicle ahead has made a full emergency stop and, in other instances where the following driver is cautious, valuable time is lost because of a failure to indicate full braking or a rapid stop and thereafter continuance of travel.

It is an object of our present invention to provide a comparatively simple, thoroughly reliable and efficient emergency or rapid-stop-indicating system, which may well be correlated with the conventional electrical stop light systems of motor vehicles, and which, through intensive illumination with a special warning light at the rear of a car, will necessarily arrest the attention of following drivers and/or drivers on crossroads, warning them that a motor vehicle is making or has made an emergency stop.

Another object is the provision of an illuminated electrical emergency signaling system of the class described wherein the emergency signal light once actuated or illuminated through rapid deceleration of the car will be maintained for warning until the driver completely releases brake control.

Another object is the provision of an illuminated warning system of the class described wherein compensation for required variance in warning light intensity for both night and day driving is effectively and substantially automatically effected.

A still further object is the provision in a system of the class described of a conveniently and manually controlled flasher switch interposed in the main circuit of the rapid stop signaling lamp whereby if a car must be stopped for some time at the side of a road or is disabled, drivers of other cars going in both directions may be effectively warned.

In one form of our invention the emergency warning circuit is initially set in operation through the medium of a so-called "inertia" switch of effective but very simple construction while in another form of our invention initial operation of the warning circuit is actuated by a special "rapid-stop" or high pressure brake switch, which is closed only when unusual braking pressure is applied by the driver for the purpose of making an emergency stop. In both forms of the invention it is important to the closely cooperating combination of elements that a holding switch be employed to prevent discontinuance of the emergency signal upon release of high pressure brake control.

The foregoing and other objects and advantages of our invention will more fully appear from the following description made in connection with the accompanying drawings wherein like reference characters refer to similar parts through the several views and in which:

Fig. 1 is an electrical system diagram showing the circuits and components of one form of our invention;

Figure 2 is a rear view of a motor vehicle equipped with our system and showing a suitable location and the structure of this special emergency stop light;

Figure 3 is an electrical diagram showing the circuits and components of another form of our invention wherein the main emergency signaling circuit is initially actuated through a high pressure brake switch; and Figure 4 is a sectional view of a high pressure brake switch used in connection with the modified form of the invention shown in Fig. 3.

Referring now to the form of our invention diagrammatically illustrated in Figure 1 of the drawings, the usual stop light circuit for a motor vehicle is diagrammed at the left side of Figure 1, including a pair of conventional stop lights 5, usually mounted at the rear and side corners of an automobile body as in the rear fenders and electrically connected by a conductor 6 with a line 7 in circuit with a conventional brake-light switch B. S. Switch B. S. is, of course, applied to the brake pedal and is actuated immediately upon initial pressure of the pedal to energize the conventional brake lights 5. These lights remain on as long as the brake pedal is depressed and their intensity does not vary in accordance with the pressure applied. The circuit described includes a source of electrical energy such as the storage battery B carried by the car, one electrode of which is usually grounded on the car frame.

In the form of the invention diagrammed in Figure 1, a main, rapid-stop or emergency-indicating circuit is shown for automatically energizing a special intensified warning light L, which light, as shown in Figure 2, is preferably positioned in a left, attention-commanding position at the rear of the car, as upon the left rear fender. Lamp L is preferably provided with two separate interconnected filaments $f$–1 and $f$–2, one of which is adapted to give a substantially more intense illumination than the other.

The operating circuit for emergency light L is controlled, as shown in Figure 1, by an inertia-actuated electrical switch wherein the spaced contacts are normally opened but will be electrically interconnected through sudden and rapid deceleration of the speed and travel of the motor vehicle. A simple and highly efficient inertia switch I. S. for the purpose intended is illustrated in Figure 1, comprising a fixedly mounted mercury tube 8 supported by a suitable bracket 9 from an upstanding support such as the dashboard D of the motor vehicle. Electrical terminals $t$–1 and $t$–2 are disposed within the hermetically sealed mercury tube and the tube is declined forwardly, as shown, so that said terminals will, in normal driving and starting, not be covered by the globule of mercury therein. With the proper inclination of the mercury tube 8, when the car in rapid travel is suddenly decelerated by applying heavy pressure to the brake control, the mercury globule momentarily moves forwardly and upwardly to cover and interconnect the terminals of contacts $t$–1 and $t$–2, thereby energizing a holding switch in the circuit. As shown, the terminal $t$–2 of the inertia switch is electrically connected with the lead wire 7 which is in the conventional and the herein auxiliary circuit for the conventional brake lights 5. The terminal $t$–1 of the mercury switch is connected with a conductor 10 of the emergency warning circuit which is, in turn, electrically connected with the coil 11a of a solenoid-holding switch 11, having a hinged armature plate or arm 11b. The other side of coil 11a, as shown, is grounded to the frame of the motor vehicle. A suitable electrical resistance element 12 is interposed between the lead wire 7 and the connection of conductor 10 with the electro-magnetic coil 11a. Current flowing through resistor 12 is sufficient to hold relay 11 energized and contacts 11b thereof closed after the relay has been initially energized by current through switch I. S.

When the holding switch 11 is closed, electrical energy will be transmitted through a conductor 13 to the input terminal of filament f–2 of the signal lamp L, and then grounded, as shown, in Figure 1 to the frame of the vehicle. The input end of the second filament f–1 of the emergency light L is connected by a wire or conductor 14 with a contact mounted on the swinging armature 15a of an electro-magnetic holding switch 15 connected in the conventional headlight circuit. Holding switch 15 has an electro-magnetic coil 15b which is electrically connected by a wire 16 with the conventional headlight switch and battery (not shown). The fixed contact of the holding switch 15 is electrically connected by a wire 17 with the conductor 13 which supplies the first filament f–2 of the emergency light L.

A pair of brake-indicating dashboard lights 18 and 19 are suitably mounted on the dashboard respectively connected to conductors 6 and 10 and grounded to the frame of the car for indicating to the driver when the usual stop lights are illuminated.

A manually actuated emergency flasher switch E is interposed in the circuit supplying the emergency light L, as shown, being bridged across the supply conductors 13 and 14. Flasher E is preferably mounted on or near the dashboard of the car and has a tumbler or movable contact, as clearly shown in the diagram of Figure 1.

In operation, a motor vehicle with our safety signal system installed therein will operate in conventional fashion both at night and in the daytime insofar as conventional stop lights, headlights and turn signals are concerned in usual driving. No attention or manual setting of the system is required for rapid stop warning since the interconnection of the emergency circuit with the standard brake light switch circuit and with the emergency switch I. S. is always ready for actuation.

In the daytime when the headlight circuit is not normally energized, both filaments f–1 and f–2 will be interconnected through the lead wires 14 and 13 to cause energization thereof when the driver applies high pressure braking power as in an emergency to avert an accident or an object. At such time, the mercury globule in inertia switch I. S. due to the very fast deceleration of the car, advances, covering contacts t–1 and t–2 and momentarily at least interconnecting the same to energize the holding switch 11 which, in turn, interconnects the source of electrical energy to the filaments of the emergency or rapid-stop-indicating light L. This holding switch 11 will maintain the circuit to the emergency light L closed until the brake pedal or control is fully released.

During daytime operation, filament f–1 will be connected in parallel with filament f–2 through lines 14 and 17 and the normally closed contacts 15a of relay 15 which, of course, will be de-energized when the headlight circuit is open. Filament f–2 and filament f–1 are energized through the contacts 11b of relay 11 and through line 20 which is connected to the battery when the coil 11a of relay 11 is energized through conductors 10 and 7 and through inertia switch I. S. when the same is closed by rapid deceleration of the vehicle and through brake switch B. S. when the brakes of the vehicle are applied. After coil 11a has been initially energized to shift the armature and contacts 11b thereof, the current flowing through resistor 12 and brake switch B. S. will be sufficient to hold the relay energized and contacts 11b closed even though inertia switch I. S. is again opened.

At night when the headlights 5 are illuminated, the magnetic holding switch 15 operates to then break connection of the armature 15a with the fixed contact of conductor 17, thus cutting out electrical connection through wire 14 of one of the filaments f–1 of emergency light L. A lesser light intensity at night is naturally required than in the daytime and our system, as has been described, automatically makes the necessary compensation for night and day driving. The intensity and location of the emergency light L indicates to following drivers as well as to traffic on side roads that the car giving this emergency signal is applying full braking pressure for a very rapid stop and this special signal is not discontinued until the driver has fully released the brake control.

In night time operation when the headlights are on and the headlight circuit is closed, filament f–2 of the emergency light L is operated in an identical manner to the daytime operation thereof. Energization of the headlight circuit will energize the coil 15b of relay 15 to open the contacts 15a thereof and thereby de-energize filament f–1 of the emergency light L. Filament f–1 is de-energized to permit the emergency flasher E to be rendered operative for flashing filament f–1 during rapid deceleration in night time use. Filament f–1 will be intermittently energized through the flasher and the contacts thereof.

If the car becomes stalled or must be left upon the highway at night, or if there is a necessity for stopping to change a tire or make a repair, the driver can readily manually touch the tumbler of the emergency flasher switch E whereupon, from the same signal light L, emergency flashes emanate to warn vehicles on the same highway that the vehicle is stopped.

In Figure 3, we diagrammatically illustrate a somewhat different form of our invention where, in lieu of the emergency switch of the form of Figure 1, a special high pressure brake switch H. P. is employed having the same relationship to the holding switch 11 as has the inertia switch in the first form described. A suitable form of high pressure or rapid stop indicating brake switch is illustrated in Figure 4, employing a small ovoid housing 21 connected at its lower end as by the small conduit 21c with the master cylinder of the hydraulic braking system of the car (not shown). Shell 21 has a centrally disposed, transverse, flexible diaphragm 21a which is reinforced at its central portion and carries on its upper side a movable contact 21b. The diaphragm is sealed at its edges with housing 21 and, as shown, carries an inverted, U-shaped element 22 on the upper side thereof which is urged downwardly by a coil spring 23 seated at its lower end on the U-shaped member and interposed between the same and the adjustable collar 24a of a threaded adjustment nut 24. The adjustment nut 24 threadedly engages the tapped bore in the upper air-containing end of the small housing 21. A short pin projects downwardly from the collar 24a for properly retaining the spring. With such adjustment, a variable tension may be imposed upon spring 23 to counter-balance the fluid pressure against the underside of the diaphragm 21a.

The small contact 21b is electrically connected with supply conductor 25. A laterally extending contact 26a is mounted in the upper portion of shell 21 extending radially inwardly and positioned to be engaged by movable contact 21b, said contact being insulated from the shell 21. This contact is connected to the wire 10 which, in turn, is connected to energize the holding switch 11.

The operation of the second form of our invention is similar to that of the first form with the exception that the emergency or rapid-stop-indicating circuit is actuated by the contacts of the high pressure switch H. P. associated with the brake pedal itself.

With both forms of our invention, there is a close and valuable coordination between the conventional rear stop lights of the motor vehicle and our "rapid stop" indicating signal. In driving, following drivers are alerted by the usual illumination of the conventional stop lights 5 as soon as the driver of the leading vehicle applies or begins to apply his brakes. Thereafter, if the leading vehicle applies high pressure braking power, the emergency light L with intensive illumination is energized, advising following traffic as well as traffic on side roads as to the degree of braking and emergency use of brakes for a sudden stop. This enables the drivers of following vehicles to properly gauge spacing on the highway and to determine the degree of braking applied by the leading vehicle and consequently loss of time, and better spacing of vehicles on a highway is made possible with the averting of many serious accidents. In other words, following traffic is alerted when brakes are first applied, and then warned immediately upon rapid stop of the leading vehicle with the elimination of successive high pressure braking by the following vehicles, starts and stops and improper spacing.

It will, of course, be understood that various changes may be made in the form, details, arrangement and proportions of the parts without departing from the scope of our invention.

What we claim is:

1. A safety signal system for motor vehicles provided with the conventional brake controls, having in combination an emergency electrical signalling light adapted to furnish intensive illumination and disposed in a predetermined position at the rear of a motor vehicle, an electrical circuit including said signal light, a switch in said circuit actuated only when said vehicle very rapidly decelerates its speed, and a control switch in said circuit actuated by said first mentioned switch and switch holding means adapted to be connected with such a brake control to maintain said circuit closed through said signal lamp until the brake control is completely released.

2. In an illuminated safety signal system for a motor vehicle of the type having a headlight circuit and a brake-operated stop light circuit, the combination of an emergency electric signal light disposed at the rear of such a motor vehicle and having several filaments for illuminating said light at at least two different intensities; an electrical circuit separately connected to each of said filaments for energizing the same and including a control switch in said circuit for closing the same, circuit means for operating said control switch and including an inertia switch actuated only when such a vehicle very rapidly decelerates and thereby causes illumination of said light, a holding circuit adapted to be connected to and energized by such a stop light circuit for maintaining said control switch closed until the vehicle brake is completely released, an auxiliary switch connected to one of said filaments and an auxiliary circuit adapted to be connected to such a headlight circuit and being associated with said auxiliary switch for operating the same and for opening said auxiliary switch when the headlight circuit is energized, whereby said emergency light will be illuminated with less intensity at night when the headlights are on than in the daytime when the headlights are off and when a quick stop is made.

3. The structure recited in claim 2 and including a flasher circuit connected to said last mentioned filament for intermittently energizing the same to cause intermittent illumination of the filament even though said auxiliary switch is open when the headlights are on and the drivers of following vehicles will thereby be apprised of an emergency situation.

4. In combination with the conventional stop light system of a motor vehicle wherein the brake-operated switch controls a switch light, an emergency electric signal circuit adapted to be connected to such a system and including an emergency light connected in said circuit and disposed in a permanent position at the rear of the motor vehicle, a control switch connected with said emergency light and adapted to close the circuit thereto for energizing the same, circuit means associated with said switch for operating the same and including an inertia switch operable only when said vehicle very rapidly decelerates and also including a holding circuit adapted to be connected to such a brake-operated switch for holding said control switch, when closed, as long as the brake of such a vehicle is applied, whereby said emergency light will be illuminated when such a vehicle is making a quick stop and thereafter until the brake is completely released to warn drivers of following vehicles of an emergency situation.

5. The structure set forth in claim 4 wherein said inertia switch comprises an elongated mercury tube switch disposed longitudinally of the motor vehicle, said mercury tube switch being inclined and having forward and rear ends, said forward end being elevated relative to said rear end whereby to carry the mercury in said rear end during constant velocity travel of the vehicle, and said mercury switch tube having a pair of electrical contacts therein disposed in spaced relation from said rear end and toward said front end and said contacts being positioned for immersion in said mercury when the same moves toward the front end of said mercury tube switch, whereby to close said switch upon sudden and rapid deceleration of the vehicle and thereby operate said emergency light.

References Cited in the file of this patent

UNITED STATES PATENTS

| | | |
|---|---|---|
| 1,142,852 | Simon | June 15, 1915 |
| 1,263,902 | Kiefer | Apr. 23, 1918 |
| 1,517,669 | Deane | Dec. 2, 1924 |
| 1,717,617 | Moore | June 18, 1929 |
| 1,946,759 | Preston | Feb. 13, 1934 |
| 2,260,680 | Nelson | Oct. 28, 1941 |
| 2,339,687 | Doane | Jan. 18, 1944 |